United States Patent [19]

Kakiura

[11] 3,783,393

[45] Jan. 1, 1974

[54] DRIFT-COMPENSATED ANALOG HOLD CIRCUIT

[75] Inventor: Hiroshi Kakiura, Yokohama, Japan

[73] Assignee: Fischer & Porter Company, Warminster, Pa.

[22] Filed: May 25, 1972

[21] Appl. No.: 256,946

[30] Foreign Application Priority Data

May 31, 1971 Japan .............................. 46/37057

[52] U.S. Cl. ................. 328/127, 328/128, 328/151, 307/230

[51] Int. Cl. .......................... G06g 7/18, H03k 5/00

[58] Field of Search .................... 328/127, 128, 151; 235/150.51, 183; 307/229, 230

[56] References Cited

UNITED STATES PATENTS 3,584,309 6/1971 Nicolson ........................ 328/151 X 3,621,224 11/1971 Friday ................................ 328/151

3,633,004 1/1972 James ........................... 235/150.51

*Primary Examiner*—John W. Huckert

*Assistant Examiner*—B. P. Davis

*Attorney*—Michael Ebert

[57] ABSTRACT

An analog integral hold circuit adapted to provide a control signal to the valve of a process control system in order to hold the valve position, the circuit being drift free. The drift-free circuit is constituted by an analog hold circuit having integrating characteristics, the output thereof being converted into digital signals that are counted by a variation-detecting circuit. The output of the variation detecting circuit is applied to a feedback circuit that delivers a compensating signal to the input of the analog hold circuit to obviate drift effects.

1 Claim, 7 Drawing Figures

DRIFT-COMPENSATED ANALOG HOLD CIRCUIT

BACKGROUND OF INVENTION

This invention relates to an electronic circuit adapted to compensate for the drift of an analog integral hold circuit.

In process control technology, it was heretofore customary to use a mechanical memory device, such as a potentiometer, to deliver a control signal to a valve in order to hold its position. However, such a mechanical device has a tendency to wear. Furthermore, it requires an expensive servomechanism to track an external signal. To overcome these shortcomings, an electronic analog hold circuit also has been used for the same purpose. In this instance, an amplifier with integrating capacitor functions electronically to drive the valve. With a circuit of this type, tracking of the external signal can be inexpensive.

However, this new method has given rise to another problem, namely drift of the output. The charge integrated in the capacitor will decay through the leakage resistance of the capacitor and limited input impedance of the amplifier, thereby changing the output with respect to time. Even when combining a high quality plastic-film capacitor and a high impedance amplifier having input bias current of less than several pA, being careful to maintain insulation resistance of the printed circuit board etc., it still has been difficult to reduce the output drift rate $\Delta E_0/E_0$ to below 1 percent/100hr. This situation is particularly aggravated under ambient conditions of high temperature and high humidity.

As another memory technique, it is well known to make use of a digital memory circuit for this purpose. However, its circuitry is generally complicated and its cost is usually excessive for this application.

SUMMARY OF INVENTION

The main object of this invention is to add a simple drift compensation circuit to an ordinary analog hold in order to obtain a drift-free analog memory without any significant cost increase.

Briefly stated, this object is obtained in a drift-compensated analog hold circuit, the hold circuit having integrating characteristics. The output of the analog hold circuit is converted by a digitalizing circuit to digital signals which are counted by a variation detecting circuit whose output is applied to a feedback circuit that delivers a compensation signal to the input circuit of the analog hold circuit.

OUTLINE OF DRAWING

For a better understanding of the invention as well as other objects and features thereof, reference is made to the following detailed description to be read in conjunction with the accompanying drawing wherein:

FIG. 1 is the basic block diagram of a system in accordance with the invention;

FIG. 2 graphically illustrates the operating principles underlying the invention;

DESCRIPTION OF INVENTION

In the figures, the following identifying symbols are employed:

$A_1$ and $C_1$: Analog hold circuit
M: External input
V: output of analog hold circuit
F: Compensation signal
I: Digitalizing circuit
II: Variation detecting circuit
III: Feedback circuit
$OSC_1$ and $OSC_2$: Pulse generator
FF: Binary counter
V/F: Voltage to frequency converter
G: Gate
F/V: Frequency to voltage converter.

Figure 1:
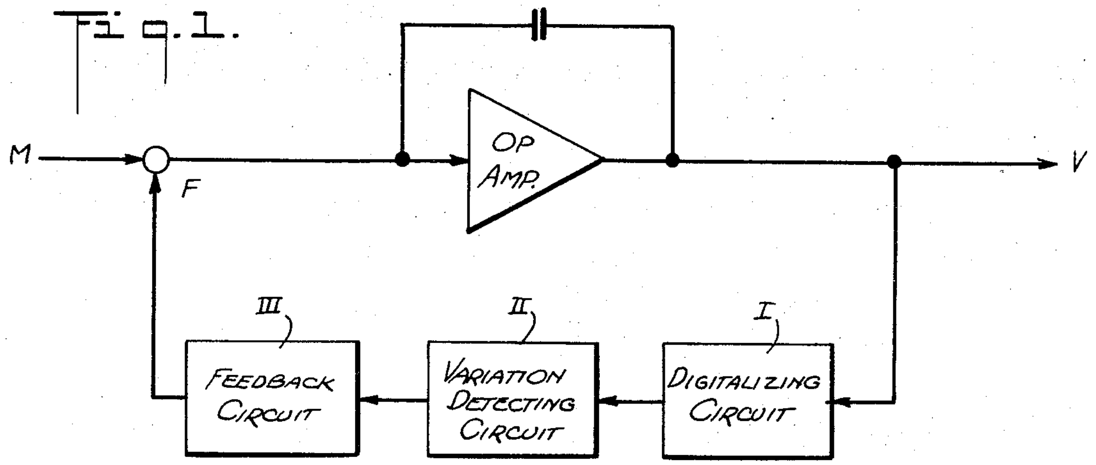

In FIG. 1, $A_1$ is an operational amplifier and $C_1$ is an integrating capacitor, and both constitute an integral hold circuit. The hold circuit produces an output signal V, an external input M being applied to the circuit to up-date output V to a desired value. The functional blocks I, II, III, comprise the drift compensating circuit.

Figure 2:
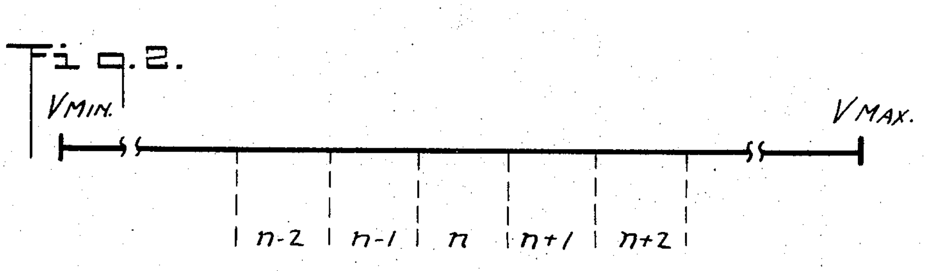

Digitalizing circuit I receives the output V from the hold circuit and converts it into a suitable form of digital signals. As shown in FIG. 2, the output V, ranging from Vmin to Vmax, is divided into a proper number of segments. Variation detecting circuit II functions as a means to sense the digitalized output variation, for instance, from nth to $(n-1)th$ or form $(n-1)th$ to $(n-2)th$ segment, etc.

The feedback circuit III coupled to variation detecting circuit II delivers a compensation signal F which causes the analog hold circuit to resume its original state. When the output V is held in the nth state and tends to decay into Vmin direction, output V will transfer from nth to $(n-1)$th state. If the polarity of signal F is so selected as to increase output V in the Vmax direction, the output V returns to the original value.

One of the most practical digitalizing methods shown in FIG. 2 is to classify the output V into two states. Namely, by a voltage to frequency converter V/F, the analog hold output can be converted to a frequency signal and counted by a binary counter. Since the counter assumes one of two counting states, output V is thereby digitalized into two states 0 or 1. Therefore, if the direction of compensation signal F is so selected that the hold output increases for 0 state and decreases for the "1" state (this relation may be reversed), and, in addition, the amount of compensation is kept larger than the natural drift amount of the hold output and smaller than one step of digital state, the analog hold output is held on one of the stable boundary of states.

Figure 3:
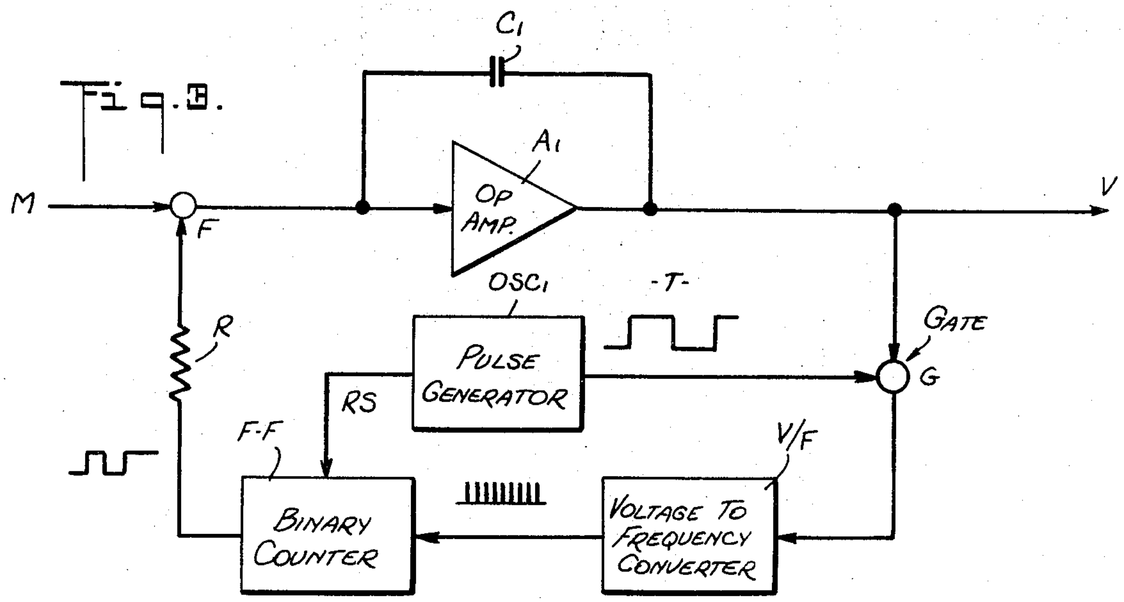
FIG. 3 is a block diagram showing one application for the invention.

Referring now to FIG. 3, a typical circuitry example is explained in detail. Pulse generator $OSC_1$ provides a pulse signal of period T. The voltage-to-frequency converter V/F converts the hold output to a high frequency pulse signal of frequency f, where f is sufficiently higher than the frequency of $OSC_1$, 1/T. Gate G for the converter V/F is controlled by the output of pulse generator $OSC_1$. When the gate G opens for a certain time interval starting from time $t_0$, the pulse signal of frequency $f$ is sent to the binary counter FF. As the gate is closed at time $t_1$, where $T/2 = t_1 - t_0$, the counter FF counts the total pulse number included in a half period of T/2 to determine whether the hold output is in 0 or 1 state.

During the next half period, $t_2-t_1$=T/2, the counter holds the final count state, "0" or "1" which can be used as the compensation signal F. Through the adjustment resistor R, this signal is applied to the input side of the hold amplifier $A_1$. During the counting interval, $t_0$ to $t_1$ the counter FF repeats 0 and 1 states alternately, hence its average influence on the hold output is nil. In the next interval, $t_1$ to $t_2$, where binary couunter FF continues to hold the "0" or "1" state, the hold output V receives positive or negative correction. Prior to next counting operation, the counter FF is reset by a signal RS yielded by $OSC_1$ in order to detect the output variation in each cycle of $OSC_1$ oscillation.

Figure 4:
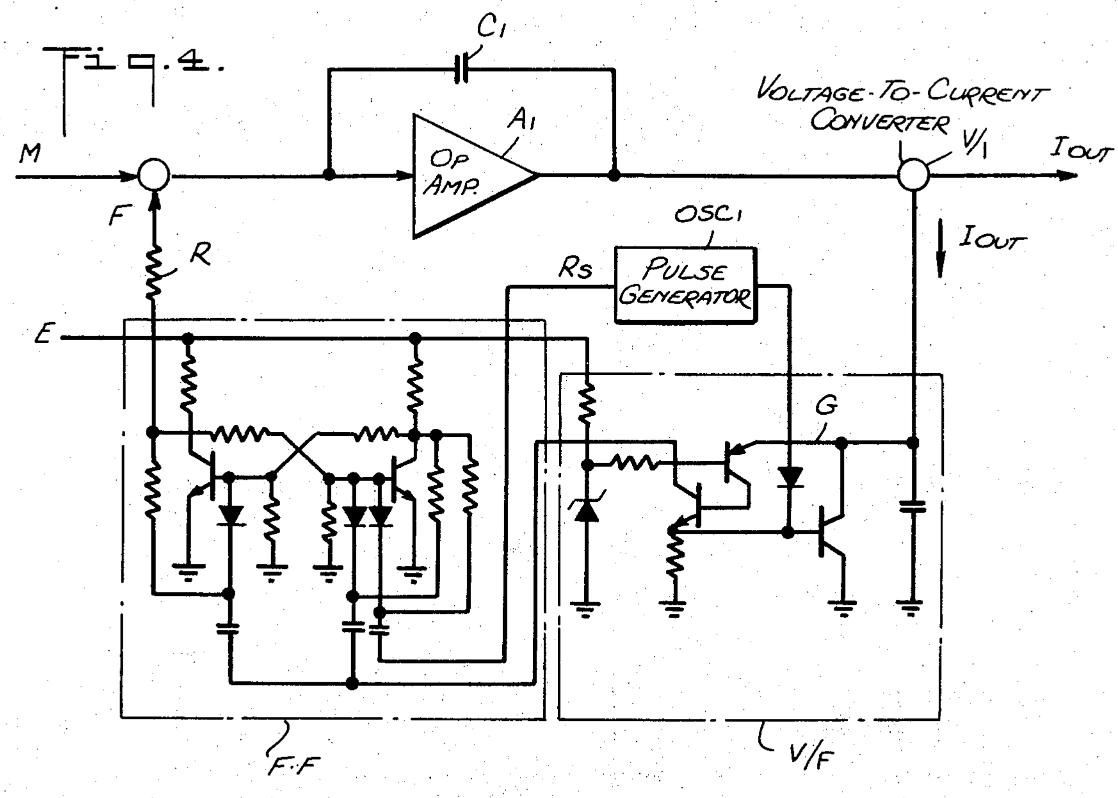
FIG. 4 is the schematic circuit diagram of the arrangement shown in FIG. 3.

A practical example of this circuitry is shown in FIG. 4, where the analog hold output from amplifier $A_1$ is converted into a current form signal $I_{out}$ by the voltage-to-current converter V/I. Assuming the output frequency span of converter V/F to be $f_0$ for $I_{out}$ full scale span and the counting interval to be t, the minimum increment of the hold output due to digitalization is expressed to $1/f_0t$.

To evaluate a typical value, suppose the current range to be 4 to 20 mA, the corresponding frequency range of V/F to be 2 to 10 kHz, the counting interval to be 50 msec, then the minimum increment is:

$$-1/(10-2)10^3 \times 0.05 \times 100 = 0.25 \text{ percent of full scale.}$$

That is, the miniumum value adjustable by the external input M is 0.25 percent and out resolution is 0.5 percent of full scale. Therefore in a case where the external signal M drives the hold output V, a small change of M cannot modify V because of the drift compensation circuit.

However, in the actual application, the variation amount of external input M is usually larger than this resolution, thereby making the counter reading meaningless. Output voltage V can be freely adjusted by external input M. When input M stops, output V holds the final value. For finer adjustment, the resolution may be improved.

In the example in FIG. 4, the hold output is subject to a minute hunting action, inasmuch as the compensation signal changes its polarity frequently. To avoid this, it is possible to control the direction of output drift and apply the compensation in the opposite direction. In this case, by making the drift amount small, the above hunting effect may be effectively suppressed.

Figure 5:
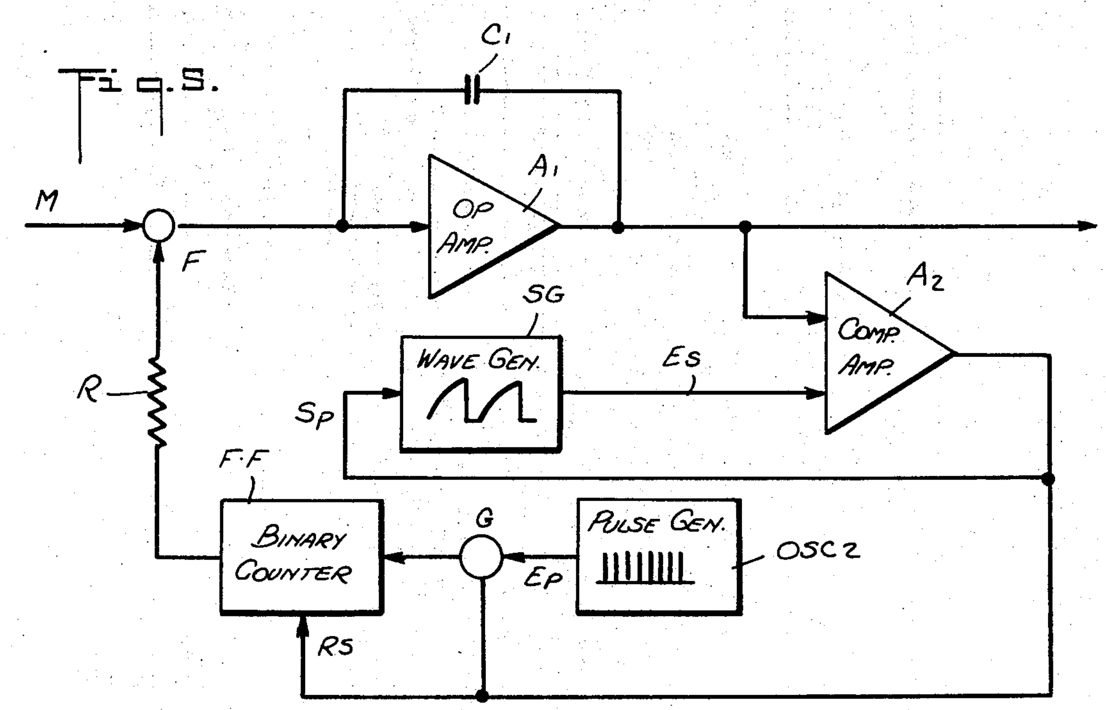
FIG. 5 is a block diagram showing another application for the invention.

As explained in connection with the arrangements shown in FIGS. 3 and 4, a V/F converter is used for digitalization of output. In FIG. 5, a clock-pulse-counting type converter is used as this component. Pulse generator $OSC_2$ generates a high frequency pulse signal $E_p$, while stage SG is a sawtooth, triangle or stair waveform generator getting a start signal $S_p$ from the comparator amplifier $A_2$ which compares the output of SG, $E_s$ and the analog hold output V. Stages SG and $A_2$ comprise a voltage-to-duty converter. By controlling the gate G with the $A_2$ output, the binary counter FF receives a number of pulses proportional to V for each cycle of $E_s$. Binary counter FF is reset by reversed output of $A_2$.

Figure 6:
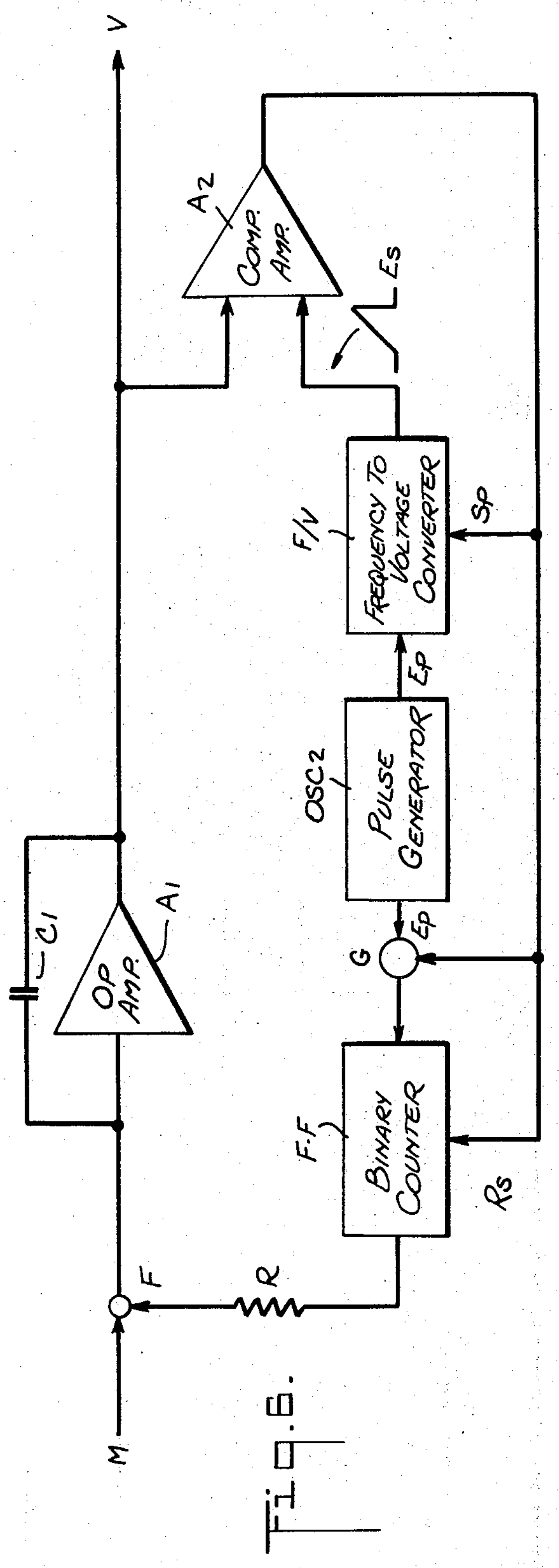
FIG. 6 is a block diagram showing still another application for the invention.

To maintain the stability of the drift compensation, the circuit in FIG. 3 should have repeatability (stability) of the oscillator $OSC_1$ and the V/F converter. In the example in FIG. 5, the oscillator $OSC_2$ and the sawtooth generator SG should be stable. Shown in FIG. 6 is an arrangement which is not influenced by oscillator frequency variations. Though its operating principle is the same as in FIG. 5, the signal $E_s$ is obtained through a frequency-to-voltage converter F/V, by integrating the $OSC_2$ output instead of using generator SG, as in FIG. 5. As the pulse counting time defined by $A_2$ is inversely proportional to the frequency of $OSC_2$ output, the pulse number passing through the gate G in each cycle is independent of the frequency. The stability of this circuit depends only on that of the F/V converter.

Figure 7:
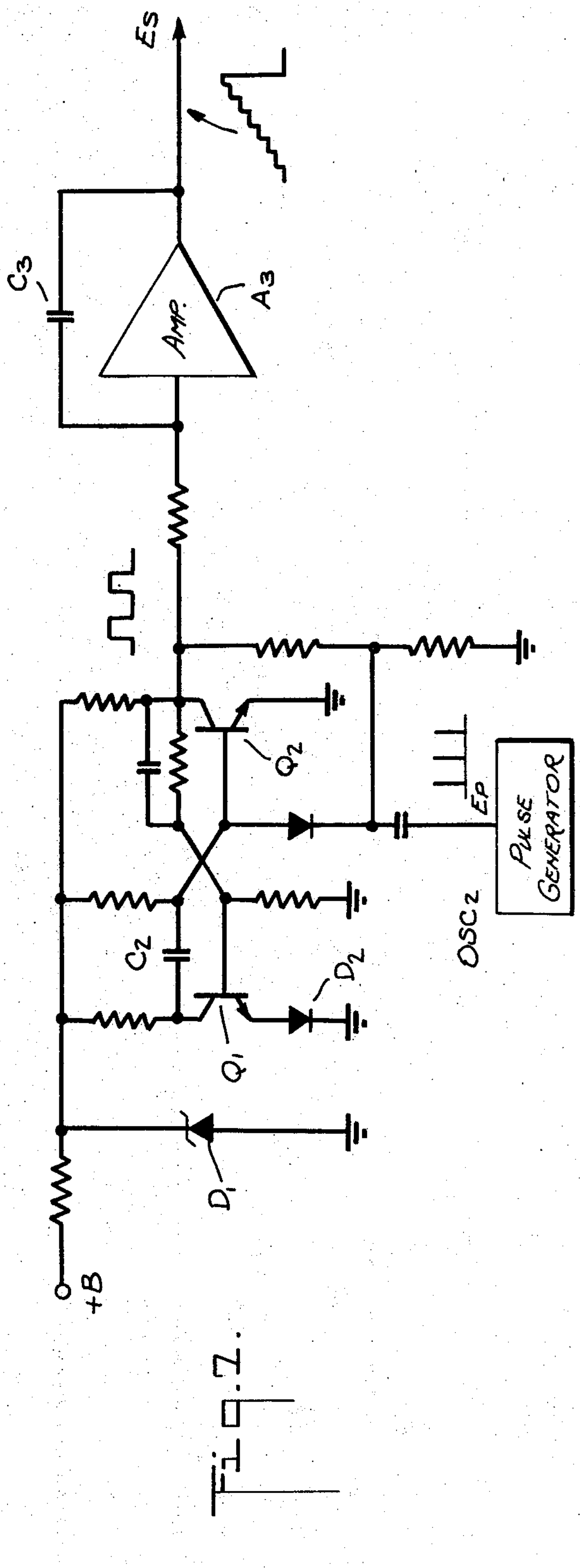
FIG. 7 is an example of the F/V converter of the type shown in FIG. 6.

FIG. 7 shows an example of F/V converter suitable for this purpose. As the oscillator $OSC_2$, a unijunction transistor type is used and its output pulse $E_p$ drives the monostable multivibrator composed of transistors $Q_1$ and $Q_2$. This multivibrator serves as a wave form shaper, for the height of output pulse is stabilized by the temperature-compensated zener diode $D_1$, while the pulse width is stabilized by the temperature compensated capacitor $C_2$ (typically a combination of silvered mica type and ceramic type having temperature coefficient of capacity of ±20 ppm/° C) and the diode $D_2$ connected into the emitter circuit of $Q_1$. As the resistors, the metal film type may be used where necessary. The stabilized output pulse is integrated by the amplifier $A_3$ provided with a feedback capacitor $C_3$ and gives a stair-case waveform signal $E_s$. In such a scheme, the stability of F/V converter can be as good as ±0.2 percent/30° C change.

From the explanation above, it will be evident that this invention has the following advantages:

1. The conventional technique to use high insulation resistance capacitor, low input bias current amplifier, and high insulation resistance printed circuit board, etc., becomes unnecessary to obtain a high stability analog hold circuit. 2. In the conventional circuit, though a substantial improvement may be attained, the drift essentially continues as a function of time, in contradistinction to the circuit according to the present invention where the drift is independent of time. 3. For ambient temperature and humidity change, the present invention is more stable. 4. Wearing problem of the mechanical memory device is solved by this invention. 5. It becomes easier and more practical to apply an analog hold type setpoint and manual station to the electronic controller. By virtue of the holding characteristics of this circuit, any mode transfer of setpoint between local and remote signal or output between auto and manual becomes socalled balanceless bumpless. 6. This circuit is lower in cost compared to a digital memory circuit. Accordingly, this invention provides an inexpensive but very stable analog hold circuit.

In the examples above, a V/F converter and a clock-pulse counter are shown as the digitalizing circuit. Various forms of A/D converters may obviously be used in the same manner. The variation detecting circuit may be either an ordinary flip-flop or simpler counters using a single transistor or thyristor, or a ternary or two stage binary counter.

The means to produce the singal $E_s$ in FIGS. 5, 6 and 7, may be simplified by direct integration of the pulse output from the monostable multivibrator with a stable resistor and capacitor. The important characteristic is not output linearity but repeatability or stability. This invention is also applicable to the analog sample hold circuit in the same manner.

While there has been shown and described a preferred embodiment of the invention, it will be appreciated that many changes and mofifications may be made therein without, however, departing from the essential spirit of the invention.

I claim:

1. A drift-compensated analog hold circuit comprising:

a an analog hold circuit having integrating characteristics and producing an output voltage in response to an input signal b a digitalizing circuit converting the output voltage of said analog hold circuit to digital signals, said circuit including a pulse generator producing periodic pulses, a gate coupled to said analog hold circuit and to said pulse generator, said gate being rendered open periodically by said pulses, and a voltage-to-frequency converter coupled to said gate to convert the output voltage passed by said gate into relatively high-frequency pulses whose frequency depends on said voltage, c a variation detecting circuit counting the output of said digitalizing circuit and thereupon detecting the variation of said digital signals, said detecting circuit being constituted by a binary counter coupled to the output of said converter and reset after each counting operation by a pulse from said generator, and d a feedback circuit receiving the output of said variation detecting circuit and delivering a compensation signal to the input circuit of said analog hold circuit.

* * * * *